US011200125B2

(12) United States Patent
Adiga et al.

(10) Patent No.: US 11,200,125 B2
(45) Date of Patent: Dec. 14, 2021

(54) FEEDBACK FROM HIGHER-LEVEL VERIFICATION TO IMPROVE UNIT VERIFICATION EFFECTIVENESS (71) Applicant: International Business Machines Corporation, Armonk, NY (US)

(72) Inventors: Narasimha Adiga, Bangalore (IN); Madhusudan Kadiyala, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 16/394,252

(22) Filed: Apr. 25, 2019

(65) Prior Publication Data
US 2020/0341875 A1    Oct. 29, 2020

(51) Int. Cl.
*G06F 11/26* (2006.01)
*G06F 11/22* (2006.01)
G06F 11/273 (2006.01)
G06F 11/277 (2006.01)

(52) U.S. Cl.
CPC .......... *G06F 11/26* (2013.01); *G06F 11/2236* (2013.01); *G06F 11/277* (2013.01); *G06F 11/2733* (2013.01)

(58) Field of Classification Search
CPC .. G06F 30/33; G06F 30/3308; G06F 30/3315; G06F 30/3323; G06F 11/263; G06F 11/2635; G06F 11/273; G06F 11/277; G06F 11/2733; G06F 11/26; G06F 11/2236
See application file for complete search history.

(56) References Cited

U.S. PATENT DOCUMENTS

| 5,745,500 | A  | * | 4/1998  | Damaria    | G01R 31/2884  |
|           |    |   |         |            | 714/30        |
| 5,896,494 | A  | * | 4/1999  | Perugini   | G06F 11/2289  |
|           |    |   |         |            | 714/27        |
| 6,351,681 | B1 | * | 2/2002  | Chih       | G01R 31/318505|
|           |    |   |         |            | 324/762.06    |
| 7,757,215 | B1 | * | 7/2010  | Zhou       | G06F 11/3644  |
|           |    |   |         |            | 717/124       |
| 9,047,427 | B1 |   | 6/2015  | Doucet et al. |            |
| 9,600,384 | B2 | * | 3/2017  | Hasan      | G06F 11/22    |
| 9,836,372 | B1 | * | 12/2017 | Khan       | G06F 11/263   |
| 9,836,567 | B2 |   | 12/2017 | Berkovitz et al. |        |
| 10,073,933| B2 |   | 9/2018  | Lu et al.  |               |

(Continued)

Primary Examiner — Joseph O Schell
(74) Attorney, Agent, or Firm — Cantor Colburn LLP; Tihon Poltavets (57) ABSTRACT Embodiments of the invention are directed to a computer-implemented method of unit environment verification. The method includes monitoring, by a processor, a data stream between a first driver and a device under test (DUT) in a unit verification environment. The processor retrieves a transaction value from a database, wherein the transaction value was generated in a higher-level verification environment than the unit verification environment. The processor transmits the retrieved transaction value to the DUT. The processor compares a response from the DUT to the transmitted transaction value to an expected value. In response to the comparison indicating an error, the processor initiates a repair of the error at the unit verification environment.

20 Claims, 6 Drawing Sheets (56) References Cited

U.S. PATENT DOCUMENTS

| | | | |
|---|---|---|---|
| 2003/0041288 A1* | 2/2003 | Kolawa | G06F 11/3688 |
| | | | 714/38.1 |
| 2005/0102596 A1* | 5/2005 | Hekmatpour | G06F 30/33 |
| | | | 714/741 |
| 2005/0283664 A1* | 12/2005 | Coulter, Jr. | G06F 11/263 |
| | | | 714/15 |
| 2007/0168727 A1 | 7/2007 | Fournier et al. | |
| 2007/0294655 A1* | 12/2007 | Campos | G11C 11/4087 |
| | | | 716/106 |
| 2010/0318850 A1* | 12/2010 | Copty | G06F 11/263 |
| | | | 714/33 |
| 2014/0107996 A1 | 4/2014 | Cummings et al. | |
| 2016/0063162 A1* | 3/2016 | Lu | G06F 30/30 |
| | | | 716/106 |
| 2020/0210592 A1* | 7/2020 | Karas | G06F 21/552 |

* cited by examiner

FEEDBACK FROM HIGHER-LEVEL VERIFICATION TO IMPROVE UNIT VERIFICATION EFFECTIVENESS

BACKGROUND

The disclosure relates generally to processor verification environments, and more specifically, to feedback from higher-level verification to improve unit verification effectiveness.

Verification is the process of determining the correctness of an algorithm in hardware and software systems in terms of requirements and specifications. Hardware description language (HDL) functional verification is used to verify whether the components of a system, which are described using HDL, match their functional specification using either functional simulation or formal verification techniques. Functional simulation is executed by a functional simulator, in which software runs on a host computer and simulates a system's operation using its HDL description. Formal verification is executed by a formal verification device and typically provides more coverage than functional simulation.

SUMMARY

Embodiments of the present invention include a method, system and computer program product for unit environment verification. A non-limiting example method includes monitoring, by a processor, a data stream between a first driver and a device under test (DUT) in a unit verification environment. The processor retrieves a transaction value from a database, wherein the transaction value was generated in a higher-level verification environment than the unit verification environment. The processor transmits the retrieved transaction value to the DUT. The processor compares a response from the DUT to the transmitted transaction value to an expected value. In response to the comparison indicating an error, the processor initiates a repair of the error at the unit verification environment.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention. Verification engineers propagate stimulation signals to devices under test (DUTs) that simulate real-world scenarios to monitor the responses and identify defects. The goal is to obtain maximum coverage, which is a metric used by engineers to determine the progress of the verification of the system. The greater the coverage, the more likely that defects have been identified and corrected prior to commercially manufacturing the system.

Verification engineers test multiple verification environments that increase in size from a unit verification environment to higher level core, integrated circuit, and system verification environment. System verification is performed to verify the correctness at a system level, in which a system includes multiple integrated circuits (IC) or chips. IC or chip verification is performed to verify the correctness at the IC level, in which an IC includes multiple processors. Processor or core verification is performed to verify correctness at the processor or core level, in which a processor or core includes multiple units. Unit verification is performed to verify the correctness at a unit. The DUT in the larger environments is stimulated by neighboring devices. In the unit verification environment, software drivers are used to stimulate the DUT. The DUT is unaware that the signal is received from a driver rather than a neighboring device.

Unit verification is based primarily on transmitting signals to a DUT and comparing the signal response to a stored reference response to derive a conclusion as to the device's behavior. The transmitted signals are designed to mimic real-world scenarios and implemented by drivers that emulate the behavior of neighboring devices, such that the unit is unaware that it is communicating with a driver and not a neighboring device. In an ideal situation resolving defects and achieving coverage is at the unit level due to advantages in terms, identification of errors, modeling size, and runtime efficiencies.

In a typical verification process, different teams of verifications engineers are tasked with verifying a system at different hierarchical levels. In some instances, one verification team verifies the system environment, integrated circuit environment, core environment, and unit environment. In other instances, different verification teams are testing the algorithms at different respective hierarchical levels. The effectiveness of the drivers to mimic and recreate relevant scenarios is based in part of the skill level of the verification engineers and the level of communication provided between engineering teams. Furthermore, as systems become more complex and more processors are employed the number of possible input combinations increase dramatically and thus increases the difficulty in achieving state space coverage. Poor coverage also results from limited or poorly drafted interface specification documents. If an issue is detected at the system, IC, or processor level, it is not always communicated properly, if at all, to verification engineers working at the unit level. As a result, certain rare or corner scenarios are often not recreated at the unit level. Furthermore, conventional verification methods and systems do not offer an automated mechanism to monitor issues at the higher level environments and recreate the scenarios at the unit verification environment. Furthermore, coverage typically does not include all or substantially all input combinations for simulations at the unit level. Additionally, coverage data does not confirm whether all or substantially or input combinations were simulated.

Turning now to an overview of the aspects of the invention, one or more embodiments of the invention address the above-described shortcomings of the prior art by providing methods, systems, and computer programs products that automatically record transaction values detected at higher level verification environments for use in a unit verification environment. These transaction values are stored in a database and queried by drivers, reproduced, and transmitted to a DUT. The automated process obviates communication gaps between verification teams that cause corner scenarios to go undetected at the unit verification environment.

Figure 1:
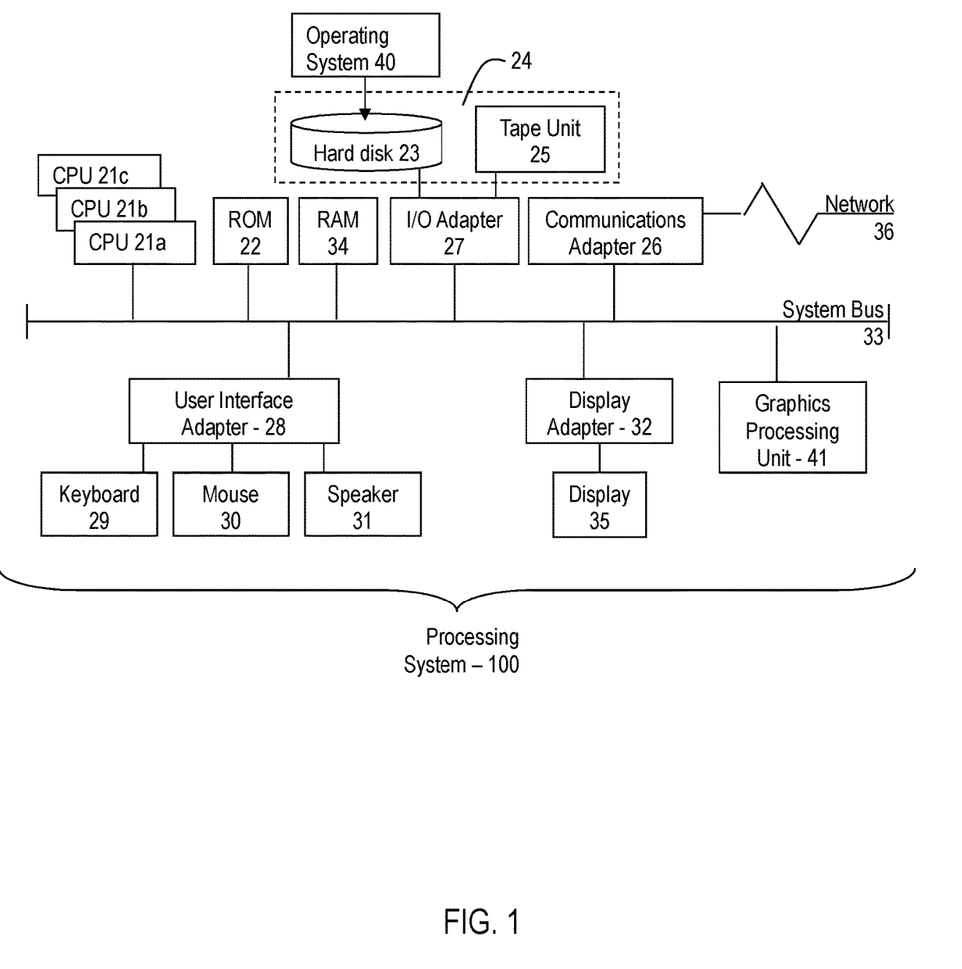
FIG. 1 depicts a system in accordance with one or more embodiments of the present invention.

Turning now to a more detailed description of aspects of the present invention, FIG. 1 depicts a system that can be used for verification of microprocessors, according to one or more embodiments of the present invention. Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

It should be appreciated that although the system 100 references central processing units 21a, 21b, 21c, one or more embodiments of the present invention are applicable for verification of multiple devices including an application specific integrated circuit (ASIC), a system on a chip (SOC), and a field programmable gate array (FPGA) with multiple units/modules.

Figure 2:
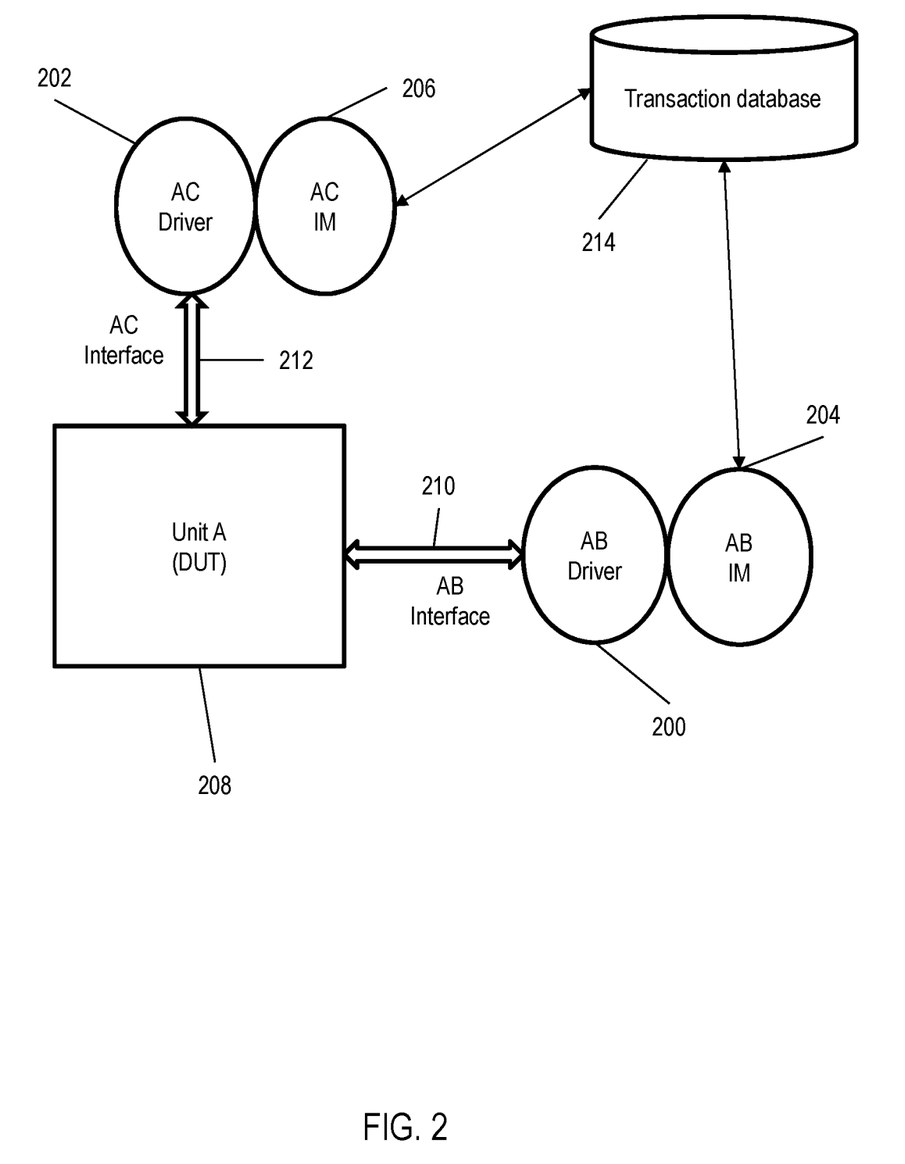
FIG. 2 depicts a core verification schematic in accordance with one or more embodiments of the present invention.

Referring to FIG. 2, there is depicted an illustration of a unit verification system according to embodiments of the present invention. As depicted, there are two drivers 200 202 each connected to a respective interface monitor (IM) 204 206. The drivers 200 202 are each connected to Unit A, which is the DUT 208 by respective interfaces 210 212. The AB IM 204 and the AC IM 206 are each connected to a transaction database 214.

During verification, the drivers 200 202 simulate neighboring device B and neighboring device C. The Driver AB 200 and driver AB 202 generate transaction values and translate the transaction values into signals which are transmitted to Unit A/DUT 208 through the interfaces 210 212. The AB driver 200 and the AC driver 202 are respectively in operable communication with AB IM 204 and AC IM 206, which monitor input/output (I/O) traffic between the AB driver 200, the AC driver 202 and Unit A/DUT 208. The AB interface 210 and AC interface 212 enable communication between the AB driver 200, the AC driver 202, and Unit A/DUT 208 using technologies such as wiring, Ethernet, fiber optics, microwave, xDSL (Digital Subscriber Line), Wireless Local Area Network (WLAN) technology, wireless cellular technology, Bluetooth technology and/or any other appropriate technology.

The AB driver 200 (and similarly the AC driver 202) receive commands and parameters for simulating a particular function of Unit A/DUT 208. In accordance with one or more embodiments of the present invention, the commands include command type, class, memory address, and data. These commands and parameters are translated to be specific to the DUT 208 and sent as signals through the AB interface 210 to the DUT 208. The AB IM 204 monitors the signal activity transmitted across the AB interface 210. The signal activity includes signals transmitted from the AB driver 200 to Unit A/DUT 208 and signals from the DUT to the AB driver 200. Throughout the simulation, Unit A/DUT 208 is unaware that it is communicating with the AB driver 200 rather than a device B. The transaction database 214 records the signal activity between the AB driver 200, the AC driver 202 and Unit A/DUT 208. Although FIG. 2 depicts a single DUT 208 and two drivers 200 202, it should be appreciated that the number of drivers in operable communication with Unit A/DUT 208 can be as few as one driver or greater than two drivers depending upon Unit A/DUT 208 and the verification design.

As described above, communication issues between verification teams at the higher levels lead to poor coverage at the core or unit verification level. To enable proper coverage and test applicable rare (corner) scenarios, one or more embodiments of the present invention include a transaction database 214. Verification activity is monitored at the unit, processor, integrated circuit, and system environments. The transaction database 214 receives and stores the transaction information from the IMs 204 and 206 during verification of the different environments. The transaction database 214 includes a counter and stores the number of times that a transaction value has been encountered across an interface.

The transaction database 214 is in operable communication with the AB driver 200 and the AC driver 202. Generally, the AB driver 200 and the AC driver 202 generate transaction values that are transmitted to the Unit A/DUT 208 to simulate real-world scenarios to verify Unit A/DUT 208. In some embodiments the AB driver 200 and/or the AC driver 202 periodically suspend generating transaction values and synchronously query the transaction database 214 for transaction values. This suspension of generating transaction values is performed either automatically or manually at the direction of a verification engineer. In some embodiments of the present invention, the transaction database stores transaction values that produced irregular responses or indicated an error at the system. In some embodiments, the AB driver 200 and/or the AC driver 202 choose transaction values based on different factors. For example, a transaction is chosen based on being directed towards a functionality of Unit A/DUT 208. In other embodiments of the present invention, the stored transaction values are compared to expected transaction values. In some embodiments, the expected transaction values are baseline transaction values. In some embodiments, the transaction values in the databased are chosen based on being a predetermined distance apart from the expected value.

In some embodiments of the present invention, the transaction database 214 is configured to not store certain transaction values. For example, transaction values within a threshold amount from a baseline value are not stored. In other embodiments of the present invention, the transaction database 214 is configured to not store transaction values related to certain functions of Unit A/DUT 208. In some embodiments of the present invention, the AB driver 200 and/or the AC driver 202 retrieve values that have been observed at the core or higher level verification environment, but not at the unit verification environment. In yet other embodiments of the present invention, the AB driver 200 and/or the AC driver 202 retrieve values that have been observed at the core or higher level verification environment and returned values above a threshold value and have been observed at the unit verification environment, but returned values below the threshold value.

In some embodiments of the present invention, the AB driver 200 and/or the AC driver 202 retrieve values based on weight as an additional criterion. In some embodiments of the present invention, each driver will synchronize querying the transaction database.

Figure 3:
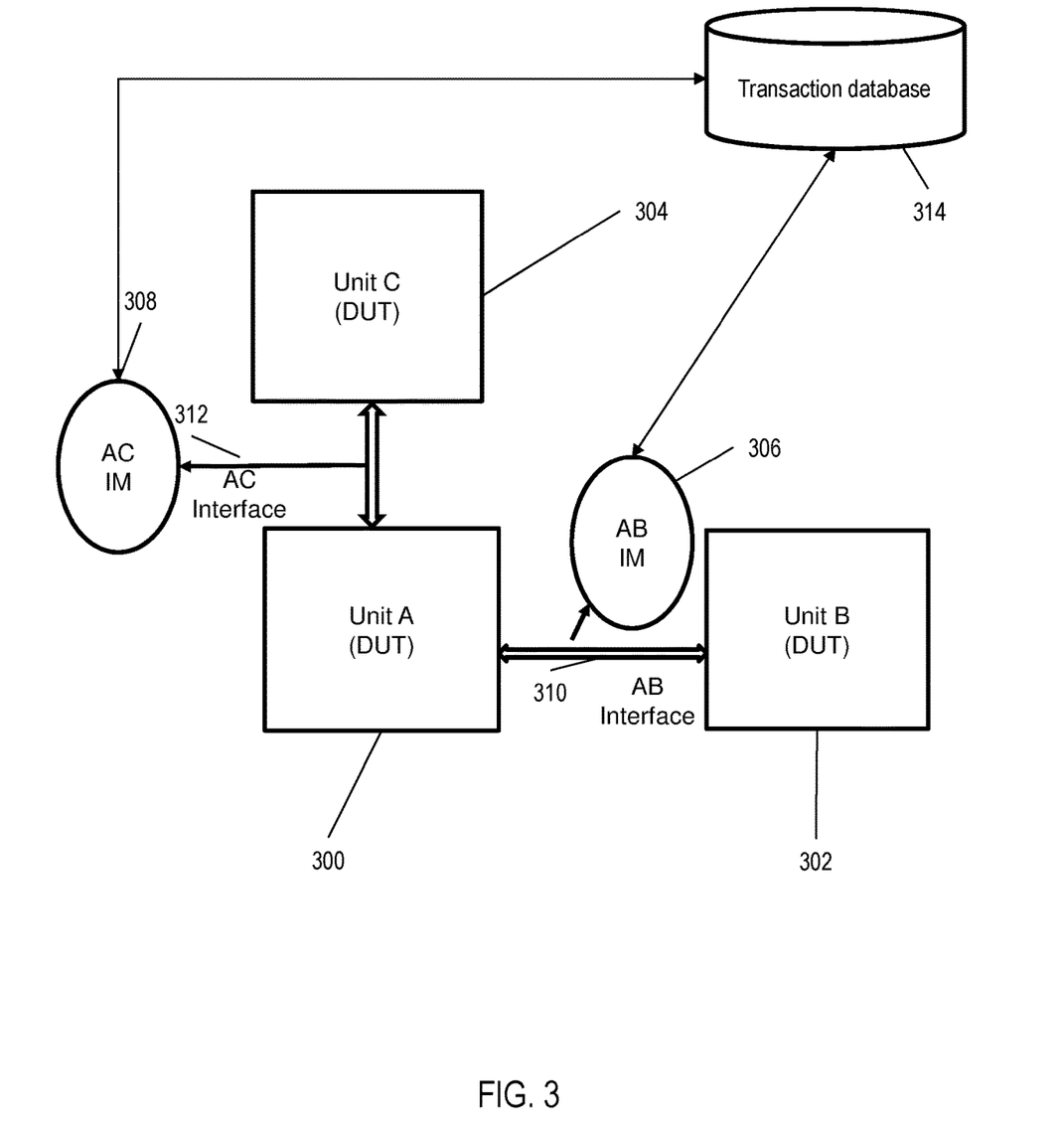
FIG. 3 depicts a unit verification schematic in accordance with one or more embodiments of the present invention.

Referring to FIG. 3, there is depicted an illustration of a core verification system, according to embodiments of the present invention. Unit A 300, Unit B 302, and Unit C 304 are depicted in FIG. 3. In some embodiments of the present invention, Unit A 300, Unit B 302, and Unit C 304 reside within an integrated circuit or a processor core. In the embodiment shown in FIG. 3 any one of the Units 300 302 304 can be a DUT during a core verification process. As each Unit 300 302 304 is in operable communication with a neighboring Unit, the core verification is performed by the neighboring unit(s) and additional drivers are not employed. Unit A 300 is respectively in operable communication with Unit B 302 and Unit C 304 through AB interface 310 and AC interface 312. The AB IM 306 and the AC IM 308 are in operable communication with a transaction database 314. The transaction database stores signal activity between Unit A 300, Unit B 302, and Unit C 304.

For illustration purposes, assume Unit A 300 is the DUT. During verification, either individually or together, Unit B 302 and Unit C 304 generate transaction values and translate the transaction values into signals which are transmitted to Unit A/DUT 300 through the AB interface 310 and/or the AC interface 312. The AC interface 310 and the AC interface 312 are respectively in operable communication with AB IM 306 and AC IM 308, which monitor input/output (I/O) traffic between Unit B 302, Unit C 304 and Unit A/DUT 300. The AB interface 310 enables communication between the Unit A/DUT 300 and Unit B. The AC interface enables communication between Unit A/DUT 300 and Unit C 304 using technologies such as wiring, Ethernet, fiber optics, microwave, xDSL (Digital Subscriber Line), Wireless Local Area Network (WLAN) technology, wireless cellular technology, Bluetooth technology and/or any other appropriate technology.

Unit B 302 and/or Unit C 304 receive commands and parameters for simulating a particular function of Unit A/DUT 300. The commands include command type, class, memory address, and data. These commands and parameter are translated to be specific to Unit A/DUT 300 and sent as signals through the AB interface 310 and/or the AC interface 312 to Unit A/DUT 300. The AB IM 306 monitors the signal activity transmitted across the AB interface 310. Similarly, the AC IM 308 monitors signal activity across the AC interface 312. The signal activity includes signals transmitted between Unit B 302 and Unit C 304 to Unit A/DUT 300.

In the core verification environment, the transaction database 314 works similarly to the transaction database 214 in the unit verification environment. In some embodiments, in which the core environment and the unit verification environment are part of the same system, the transaction database is the same database for the unit verification environment and the core environment.

The transaction database 314 is in operable communication with the AB IM 306 and the AC IM 308. Generally, Unit B 302 and/or Unit C 304 generates transaction values that are transmitted to the Unit A/DUT 300 to simulate real-world scenarios. Similar to the unit verification environment, periodically, either Unit B 302 and/or Unit C 304 suspend generating transaction values and query the transaction database 314 for transaction values. This suspension of generating transaction values is performed either automatically or manually at the direction of a verification engineer. For example, the transaction database stores transaction values that produced irregular values or indicated an error at the system. For example, a transaction value is chosen based on being directed towards a functionality of Unit A/DUT 300. In other embodiments of the present invention, the stored transaction values are compared to baseline transaction values and chosen based on being a threshold amount apart from the baseline value.

In some embodiments of the present invention, the transaction database 214 is configured to not store certain transaction values. For example, transaction values within a threshold amount from a baseline value are not stored. In other embodiments of the present invention, the transaction database 214 is configured to not store transaction values related to certain functions of Unit A/DUT 208. In some embodiments of the present invention, either Unit B 302 and/or Unit C 304 retrieve values that have been simulated at the core or higher level environment, but not at the unit verification environment. In yet other embodiments of the present invention, the either Unit B 302 and/or Unit C 304 retrieve values that have been simulated at the core or higher level and returned values above a threshold value and have been simulated at the unit level, but returned values below the threshold value.

In some embodiments of the present invention, the AB driver 200 and/or the AC driver 202 retrieve values based on weight as an additional criterion. In some embodiments of the present invention, each driver will synchronize and transmit the same transaction values to Unit A/DUT 300.

Figure 4:
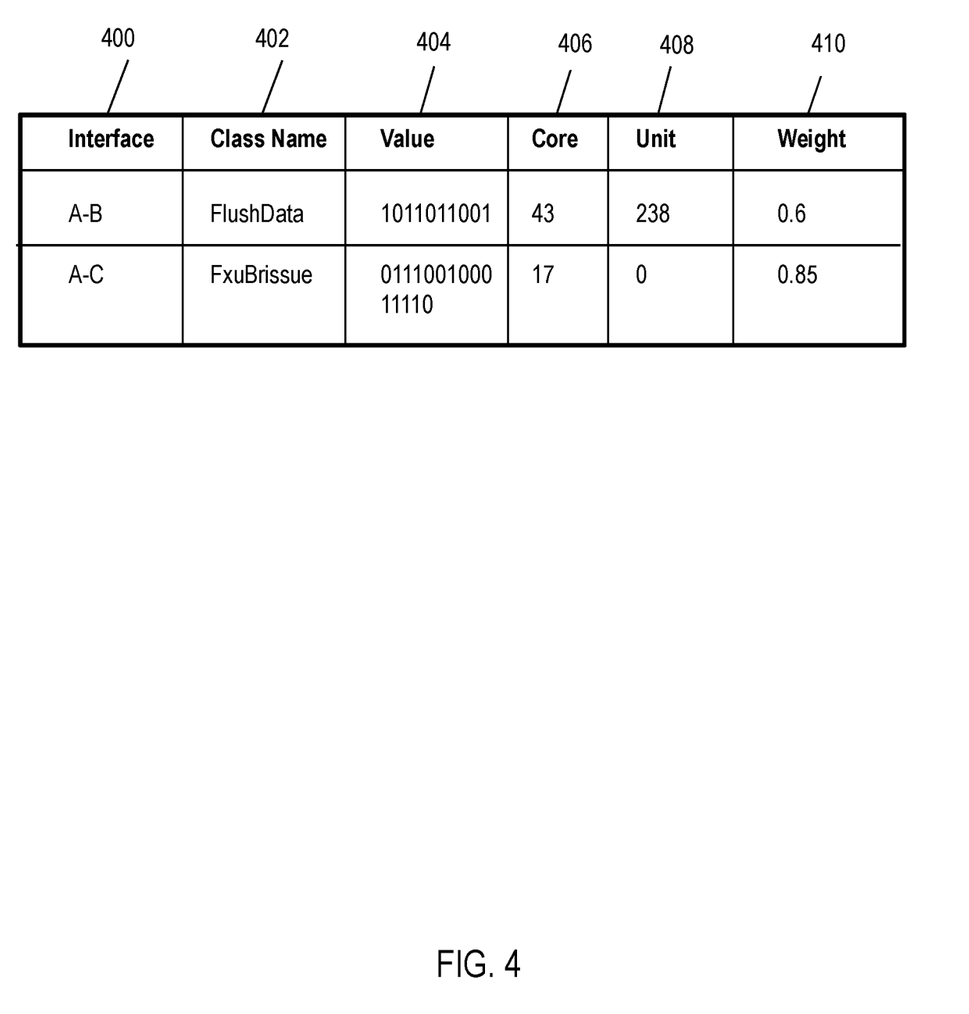
FIG. 4 depicts values stored at the transaction database in accordance with one or more embodiments of the present invention.

FIG. 4 depicts two exemplary entries in the transaction database, according to one or more embodiments of the present invention. In some aspects, an entry includes an interface 400, a class name 402, a transaction value 404, a number of hits at the core 406, a number of hits at a Unit 408, and a weight 410.

Figure 5:
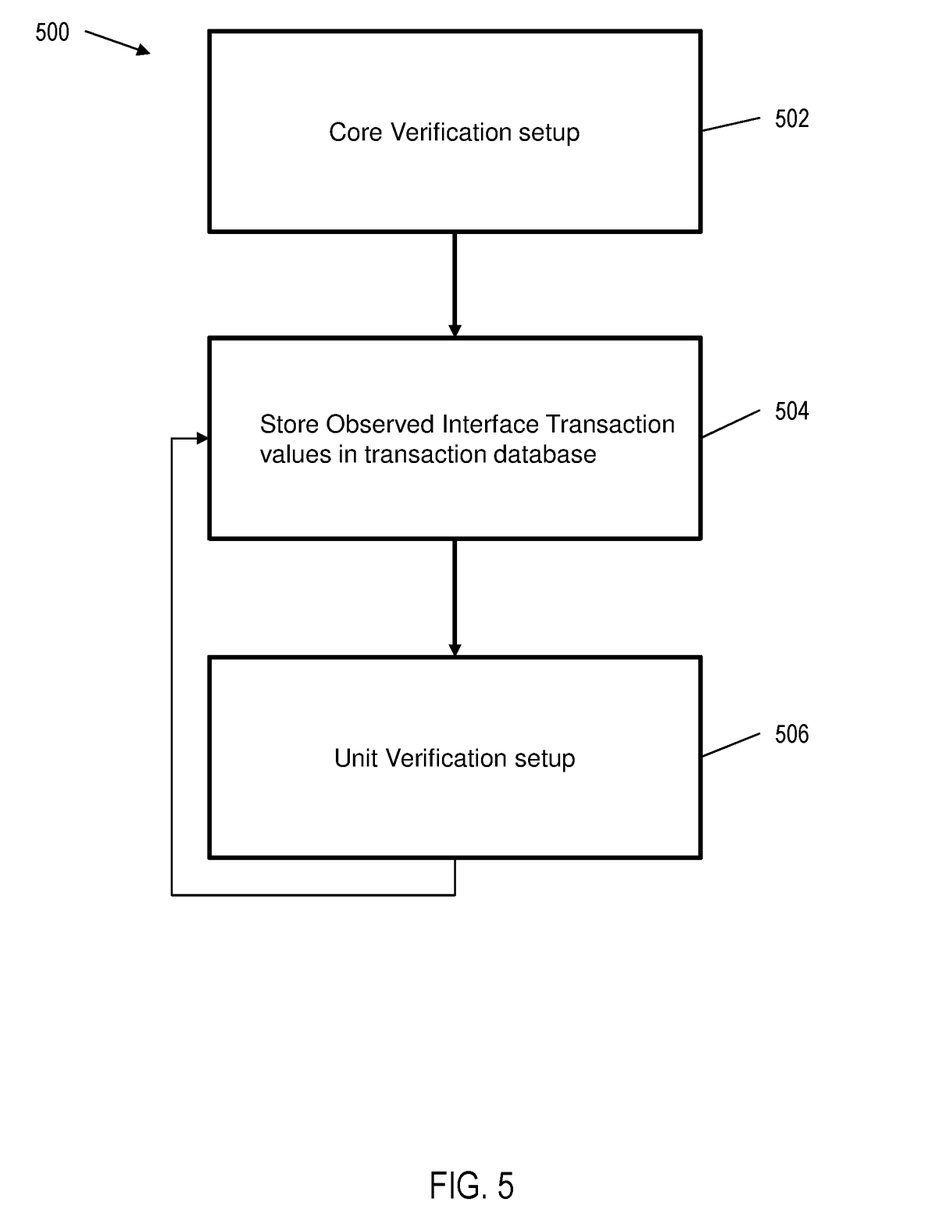
FIG. 5 depicts a process flow in accordance with one or more embodiments of the present invention.

FIG. 5 depicts a flow diagram of a method for performing verification at the core environment according to one or more embodiments of the present invention. The method 500 includes setting up core verification at block 502. A DUT is chosen and any neighboring units are identified. The neighboring units generate transaction values to simulate real-world scenarios and transmit the transaction values across an interface to the DUT. IM monitors the signal activity, including the transaction values going to the DUT and from the DUT to the transmitting unit, and store the values in the transaction database at block 504. In some embodiments, the transaction values are weighted prior to storage in the transaction database based on a critically of the value. For example, a value is weighted due to causing a failure at the core environment. In some embodiments of the present invention, a transaction value weight is based on a percentage of coverage events hit by a run related to a coverage tag. For example, a transaction value observed in a core that resulted in a defect is weighted a 1, whereas a transaction value not observed to result in a defect is weighted 0.5. In other embodiments of the present invention, a transaction value weighted by percent of coverage events hit, such as 0.9 for a greater than or equal to 90% hit. In some other embodiments, the transaction values are weighted per user determination. The transaction values stored in the transaction database are used by drivers to generate transaction values at the unit verification environment at block 506. The transaction values generated from the unit verification environment are stored at the transaction database.

Figure 6:
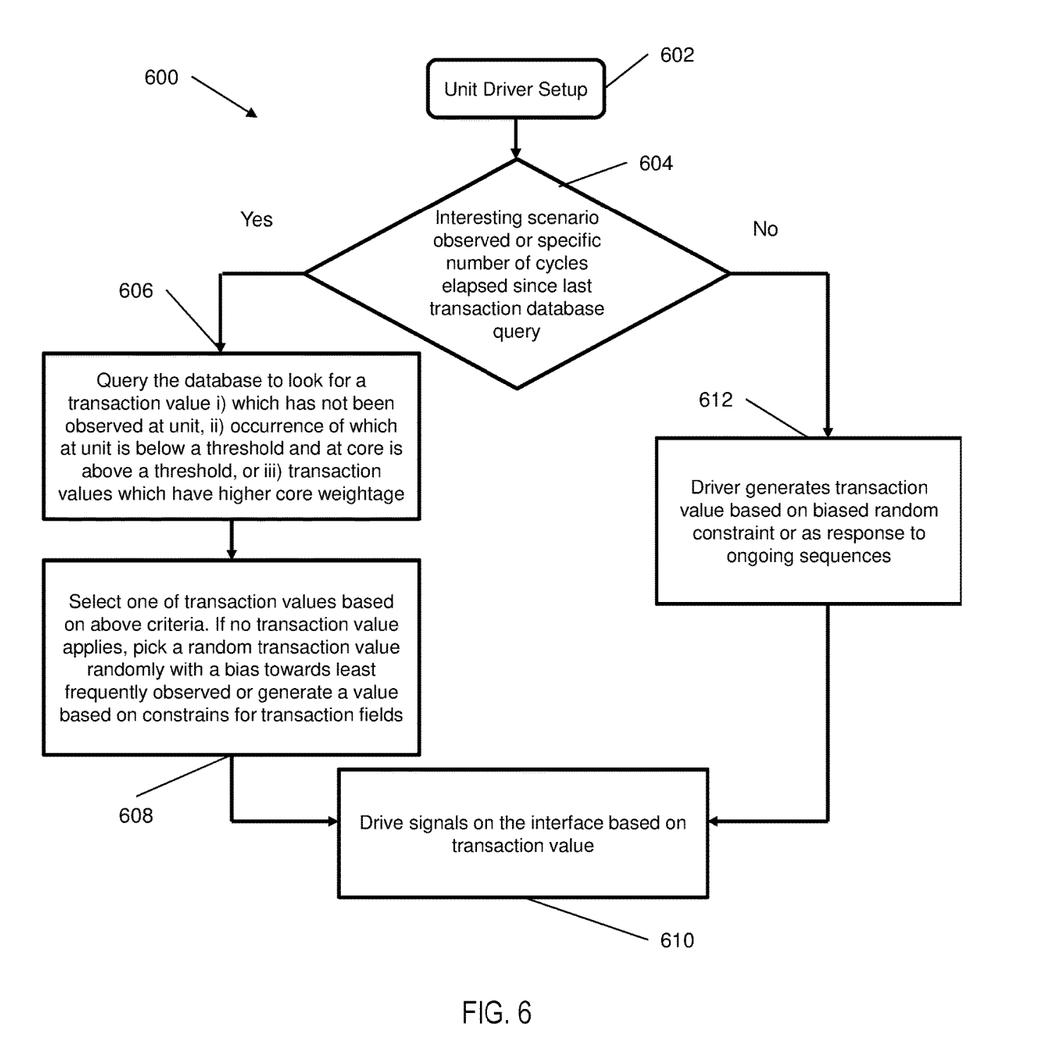
FIG. 6 depicts a process flow in accordance with one or more embodiments of the present invention.

FIG. 6 depicts a flow diagram of a method 600 for performing verification at the unit verification environment according to one or more embodiments of the present invention. The method 600 includes setting up core verification at block 602. A DUT is chosen from at least two units and at least one driver and an IM are placed in operable communication with the DUT. The drivers generate transaction values to simulate real-world scenarios and transmit the transaction values across an interface to the DUT. A scenario includes the transaction values transmitted from the driver to the DUT and any response signals either to or from the driver and the DUT. At block 604, the driver periodically queries the transaction database for stored transaction values. In some embodiments, the driver queries the transaction database based on the occurrence of a scenario. The scenario includes an event-like exception, a state of a changing object, runtime errors, user-specified criteria, instruction completion, a driver generating a "response transaction" to a request or other instances in which a corner defect is exposed at the unit level. In other embodiments, the driver queries the transaction database after a predetermined number of clock cycles. In yet some other embodiments, multiple drivers are synchronized to periodically query the transaction database to generate unique randomness.

If the driver has been triggered to query the database, the driver searches for transaction values which have not been observed at the unit verification environment, the occurrence of the values at the unit verification environment is below a first threshold count, transaction values that occur greater than a second threshold count at the core, integrated circuit, or system verification environment, or transaction values that have a weight above a third threshold value at block 606. If one of the above criteria exists, the driver selects that transaction value and transmits it to the DUT. If multiple transaction values exist that fit the above referenced criteria, the driver transmits each of the transaction values at block 608. If, alternatively no transaction value is found in the transaction database fitting these criteria, the driver chooses a pseudo-random transaction value that has occurred at the unit level below a fourth threshold amount, wherein the fourth threshold amount is greater than the first threshold amount. If, however, the driver has not been triggered to query the transaction database, the driver generates a transaction value based on a biased random constraint, predetermined criteria, or based on a response to an ongoing sequence at block 612.

In both paths, the driver transmits the transaction values to the DUT at block 610. The responses are monitored and compared to baseline transaction values. If an error is detected at the unit level, the developers are notified and correct the error. Upon detecting the indication of an error, a repair or the initiation of a repair is performed at the unit verification environment.

Additional processes may also be included. It should be understood that the processes depicted in FIG. 5 and FIG. 6 represent illustrations, and that other processes may be added or existing processes may be removed, modified, or rearranged without departing from the scope and spirit of the present disclosure.

One or more embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   monitoring, by a processor, a data stream between a first driver and a device under test (DUT) in a unit verification environment;
   retrieving, by the processor, a transaction value from a database, wherein the transaction value was generated in and caused an error in a higher-level verification environment than the unit verification environment;
   transmitting, by the processor, the retrieved transaction value to the unit verification environment of the DUT;
   comparing, by the processor, a response from the unit verification environment of the DUT to the transmitted transaction value to an expected value; and
   in response to the comparison indicating an error, initiating a repair of the error at the unit verification environment, wherein the higher-level verification environment comprises one of a system verification environment, an integrated circuit verification environment, and a core verification environment.

2. The computer-implemented method of claim 1, further comprising repeating the retrieving after a predetermined number of clock cycles has elapsed.

3. The computer-implemented method of claim 1, wherein the database is queried by multiple drivers including the first driver.

4. The computer-implemented method of claim 1, wherein the retrieved transaction value is associated with at least one selected from the group consisting of: an event exception, a state of a changing object, runtime errors, user-specified criteria, and instruction completion in the higher-level verification environment.

5. The computer-implemented method of claim 1, wherein the retrieved transaction value has been previously observed at a number below a first threshold amount at the unit verification environment.

6. The computer-implemented method of claim 1, wherein the retrieved transaction value has been previously observed at the unit verification environment at a number below a first threshold amount and has been previously observed at a processor verification environment at a number above a second threshold amount.

7. The computer-implemented method of claim 1, wherein the retrieved transaction value has a weighted value.

8. The computer-implemented method of claim 1, wherein the retrieved transaction value is pseudo-randomly chosen with a bias towards a least frequently observed transaction value at the unit verification environment.

9. The computer-implemented method of claim 1, further comprising:
   storing, in the database, transaction values retrieved during verification of a processor verification environment, an integrated circuit verification environment, and a system verification environment.

10. A system comprising:
    a memory having computer readable instructions; and
    one or more processors for executing the computer readable instructions, the computer readable instructions controlling the one or more processors to perform operations comprising:
      monitoring a data stream between a driver and a device under test (DUT) in a unit verification environment;
      retrieving a transaction value from a database, wherein the transaction value was generated in and caused an error in a higher-level verification environment than the unit verification environment;
      transmitting the retrieved transaction value to the unit verification environment of the DUT;
      comparing a response from the unit verification environment of the DUT to the transmitted transaction value to an expected value; and
      in response to the comparison indicating an error, initiating a repair of the error at the unit verification environment, wherein the higher-level verification environment comprises one of a system verification environment, an integrated circuit verification environment, and a core verification environment.

11. The system of claim 10, wherein the one or more processors are further configured to repeat the retrieving after a predetermined number of clock cycles has elapsed.

12. The system of claim 10, wherein the database is queried by multiple drivers including the first driver.

13. The system of claim 10, wherein the retrieved transaction value is associated with at least one selected from the group consisting of: an event exception, a state of a changing object, runtime errors, user-specified criteria, and instruction completion in the higher-level verification environment.

14. The system of claim 10, wherein the retrieved transaction value has been previously observed at a number below a first threshold amount at the unit verification environment.

15. The system of claim 10, wherein the retrieved transaction value has been previously observed at a number below a first threshold at the unit verification environment and has been previously observed at a number above a second threshold amount at a processor verification environment.

16. The system of claim 10, wherein the retrieved transaction value has a weighted value.

17. The system of claim 10, wherein the retrieved transaction value is pseudo-randomly chosen with a bias towards a least frequently observed transaction value at the unit verification environment.

18. The system of claim 10, wherein the one or more processors are further configured to:
store, in the database, transaction values retrieved during verification of a processor verification environment, an integrated circuit verification environment, and a system verification environment.

19. A computer program product comprising a computer readable storage medium having program instructions embodied therewith, the program instructions executable by a processor to cause the processor to perform operations comprising:

monitoring a data stream between a driver and a device under test (DUT) in a unit verification environment;

retrieving a transaction value from a database, wherein the transaction value was generated in and caused an error in a higher-level verification environment than the unit verification environment;

transmitting the retrieved transaction value to the unit verification environment of the DUT;

comparing a response from the unit verification environment of the DUT to the transmitted transaction value to an expected value; and in response to the comparison indicating an error, initiating a repair of the error at the unit verification environment, wherein the higher-level verification environment comprises one of a system verification environment, an integrated circuit verification environment, and a core verification environment.

20. The computer program product of claim 19, wherein the retrieved transaction value is associated with at least one selected from the group consisting of: an event exception, a state of a changing object, runtime errors, user-specified criteria, and instruction completion in the higher-level verification environment.

* * * * *